(12) United States Patent
Chandran et al.

(10) Patent No.: US 10,296,642 B1
(45) Date of Patent: May 21, 2019

(54) RANKING CONTENT FOR USER ENGAGEMENT

(71) Applicant: Google Inc., Mountain View, CA (US)

(72) Inventors: Harish Chandran, Sunnyvale, CA (US); Junbin Teng, Cupertino, CA (US); Alessandra Mazzia, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 332 days.

(21) Appl. No.: 14/732,356

(22) Filed: Jun. 5, 2015

(51) Int. Cl.
*G06F 17/30* (2006.01)
(52) U.S. Cl.
CPC .............................. *G06F 17/30864* (2013.01)
(58) Field of Classification Search
None
See application file for complete search history.

(56) References Cited

U.S. PATENT DOCUMENTS 6,092,049 A * 7/2000 Chislenko ......... G06F 17/30699
705/7.29
9,633,376 B2 * 4/2017 Fletcher ............. G06Q 30/0269
2012/0278625 A1 * 11/2012 Narayanan .............. H04L 9/006
713/175
2016/0026713 A1 * 1/2016 Katic .................. G06F 17/3053
707/709

OTHER PUBLICATIONS

Eugene Agichtein;"Learning User Interaction Models for Predicting Web Search Results Preferences"; 2006; ACM; pp. 3-10.*

* cited by examiner

*Primary Examiner* — Mariela Reyes
*Assistant Examiner* — Jermaine A Mincey
(74) *Attorney, Agent, or Firm* — Patent Law Works LLP (57) ABSTRACT

A system comprising a processor and a memory storing instructions that, when executed, cause the system to receive a record of data describing user engagement with content items in an online service; prepare the record of data for generating a model characterizing a network effect of a user interaction with a content item in the online service; generate the model characterizing the network effect of the user interaction with the content item in the online service; generate a predicted network effect score for a plurality of content items based on the model; organize the plurality of content items based on the predicted network effect score; and transmit the plurality of organized content items for presentation to a user. The disclosure also includes similar methods and computer program products.

21 Claims, 9 Drawing Sheets

RANKING CONTENT FOR USER ENGAGEMENT

BACKGROUND

The present disclosure relates to ranking and selecting content items for presentation to users in an online service, e.g., in a social network.

The popularity and use of the Internet, web browsers, social networks and other types of electronic communication has grown in recent years. In particular, social networks can now include content including posts, images, endorsements, activity, videos, etc. Social networks can present a stream of content items to a user that are ranked for the satisfaction of that user. However, the overall engagement of the social network may be ignored when ordering content items to present to a user.

SUMMARY

The present disclosure relates to systems and methods for ranking and selecting content items for presentation to users in an online server, e.g., a social network, that increase the overall engagement of the online service. According to one innovative aspect of the subject matter in this disclosure, a system having one or more processors and a memory storing instructions that, when executed, cause the system to: receive a record of data describing user engagement with content items in an online service; prepare the record of data for generating a model characterizing a network effect of a user interaction with a content item in the online service; generate the model characterizing the network effect of the user interaction with the content item in the online service; generate a predicted network effect score for a plurality of content items based on the model; organize the plurality of content items based on the predicted network effect score; and transmit the plurality of organized content items for presentation to a user.

In general, another innovative aspect of the subject matter described in this disclosure may be implemented in methods that include receiving, using one or more processors, a record of data describing user engagement with content items in an online service; preparing, using the one or more processors, the record of data for generating a model characterizing a network effect of a user interaction with a content item in the online service; generating, using the one or more processors, the model characterizing the network effect of the user interaction with the content item in the online service; generating, using the one or more processors, a predicted network effect score for a plurality of content items based on the model; organizing, using the one or more processors, the plurality of content items based on the predicted network effect score; and transmitting, using the one or more processors, the plurality of organized content items for presentation to a user.

Other implementations of one or more of these aspects include corresponding systems, apparatus, and computer programs, configured to perform the actions of the methods, encoded on computer storage devices.

These and other implementations may each optionally include one or more of the following features. For example, preparing the data may include generating, using the one or more processors, a graph of interactions with the content item from the record of data; generating, using the one or more processors, an engagement score for each interaction in the graph; and storing the content item and the engagement scores in a data structure. Further, the features may include: determining, using the one or more processors, a network effect score for the user interaction with the content item; associating, using the one or more processors, content item features with the network effect score for the user interaction with the content item; and identifying, using the one or more processors, content item features that are characteristic of a high network effect score for the user interaction. Additionally, identifying content item features that are characteristic of a high network effect score may include performing a regression analysis on a plurality of content items and associated network effect scores. In some instances, the operations may further include determining, using the one or more processors, an interaction type to increase; and increasing, using the one or more processors, a weight given to the selected user interaction in determining the network effect score. In various instances, the user interaction may be one from the group of: creating a new content item, endorsing an existing content item, resharing an existing content item, commenting on an existing content item, endorsing a comment on an existing content item, clicking-through a link in an existing content item, or playing media associated with an existing content item. The features may also include transmitting a recommended interaction for a content item to the user, wherein the recommended interaction is based on the predicted network effect score.

These implementations are particularly advantageous in a number of respects. For instance, the technology described herein can optimize a stream of content items to increase overall engagement in the online service. The increase in overall engagement may lead to enhanced participation rates and improve the overall health of the online service. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Systems, methods and interfaces for ranking and selecting content items for presentation to users in an online service, e.g., a social network, that increase the overall engagement of the online service. While the systems, methods of the present disclosure are described in the context of a social network server, it should be understood that the systems, methods and interfaces can be applied to other systems external to the social network for ranking and selecting content items for presentation to users in the social network that increase the overall engagement of the social network.

Figure 1:
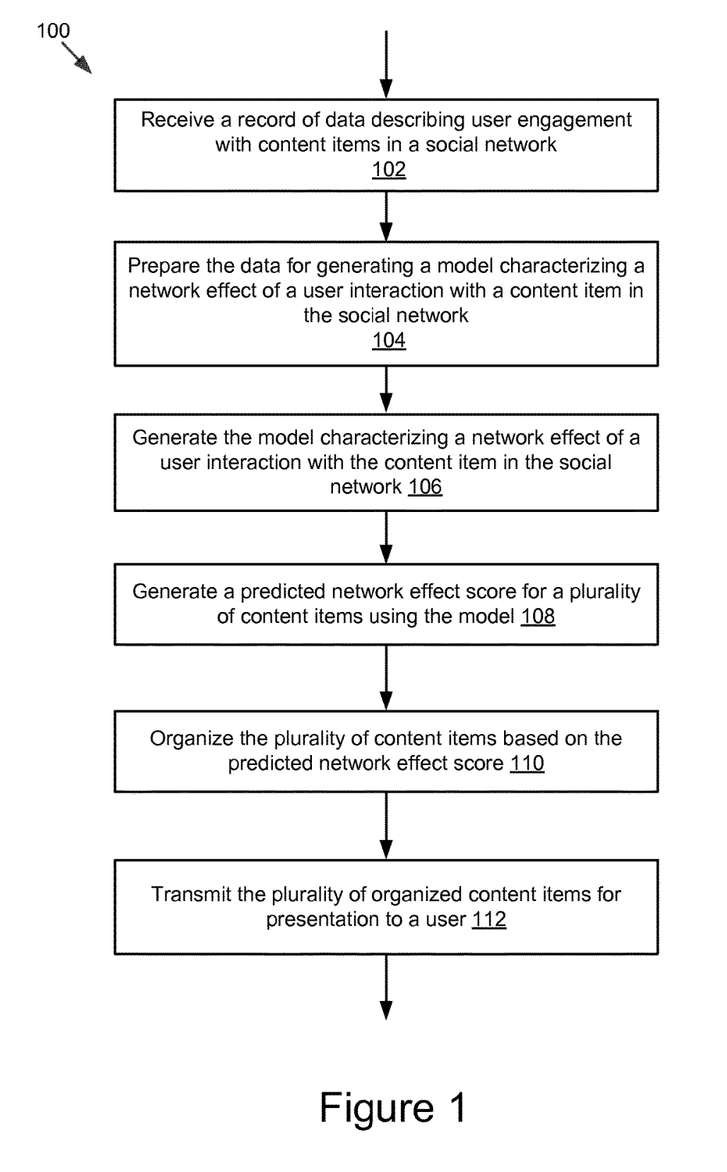
FIG. 1 is a flow chart of an example method for ranking and selecting content items for presentation to users in an online service that increase the overall engagement of the online service.

FIG. 1 is a flow chart of an example method 100 for ranking and selecting content items for presentation to users in an online service that increase the overall engagement of the online service. The method 100 begins at 102 with receiving a record of data describing user engagement with content items in an online service, e.g., a social network. For example, an engagement measurement module 920 determines user interaction with content items in the social network. In situations in which the systems discussed here collects personal information about users, or may make use of personal information, the users may be provided with an opportunity to control whether programs or features collect user information (e.g., information about a user's social network, social actions or activities, profession, a user's preferences, or a user's current location), or to control whether and/or how to receive content items from the content application according to the techniques discussed here. For example, the user may be presented with an option to accept or decline permission for the engagement measurement module 920 to keep a record of the user's engagement with content items in the social network. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content application.

In various implementations, the content items may include, for example images, videos, articles, news, status updates, and the like. When a user interacts with a content item, the engagement measurement module 920 stores a record of the interaction including an identification of the content item and the interaction type. For example, the engagement measurement module 920 may store a tuple <user, subject content item, interaction type, resultant content item, timestamp> in a data structure in database 943. An interaction type may include, for example: creating a new content item; endorsing an existing content item; resharing an existing content item; commenting on an existing content item; endorsing a comment on an existing content item; clicking-through a link in an existing content item; playing media associated with an existing content item; or the like.

The method 100 continues at 104 with preparing the data for generating a model characterizing a network effect of a user interaction with a content item in the social network. Preparing the data for generating the model characterizing the network effect of the user interaction may include, for example, scoring the engagement attributed to the interaction and associating the engagement score with the interaction in a data structure as described in more detail with reference to FIG. 2.

The method 100 continues at 106 with the training module 924 generating the model characterizing a network effect of a user interaction with the content item in the social network. In some implementations, the training module 924 generates the model using a regression analysis. Additionally, the training module 924 can generate more than one model for simultaneous use in ranking and selecting content items for presentation to users. For example, using prepared data for a number of user interactions, the training module 924 can train a logistic regression that predicts whether or not a user will interact with content items presented in a stream of content items based on other users' interaction with the content item. In one implementation, the training module 924 may bias the training to incorporate a content item score by setting the content item score to be equal to the score of the interaction that resulted from that content item. One advantage to the biased training is that the training module 924 can create a logistical regression model that is smaller than a linear regression model. Additionally, the training module 924 can generate a linear regression using machine learning to predict the score of an interaction. In various implementations, the training module 924 can build multiple models using different discount factors (as described elsewhere herein) and choose the model that generates the best results.

At 108, a content item scoring module 926 generates a predicted network effect score for a plurality of content items using the model. The plurality of content items may be those content items that are stored in a database 943 and available for presentation to a user in the social network. The method 100 continues at 110, with the content item scoring module 926 organizing the plurality of content items based on the predicted network effect score. For example, the content item scoring module 926 may order the plurality of content items from the highest predicted network effect score to the lowest. At 112, the content application 707 transmits the plurality of organized content items for presentation to the user.

Figure 2:
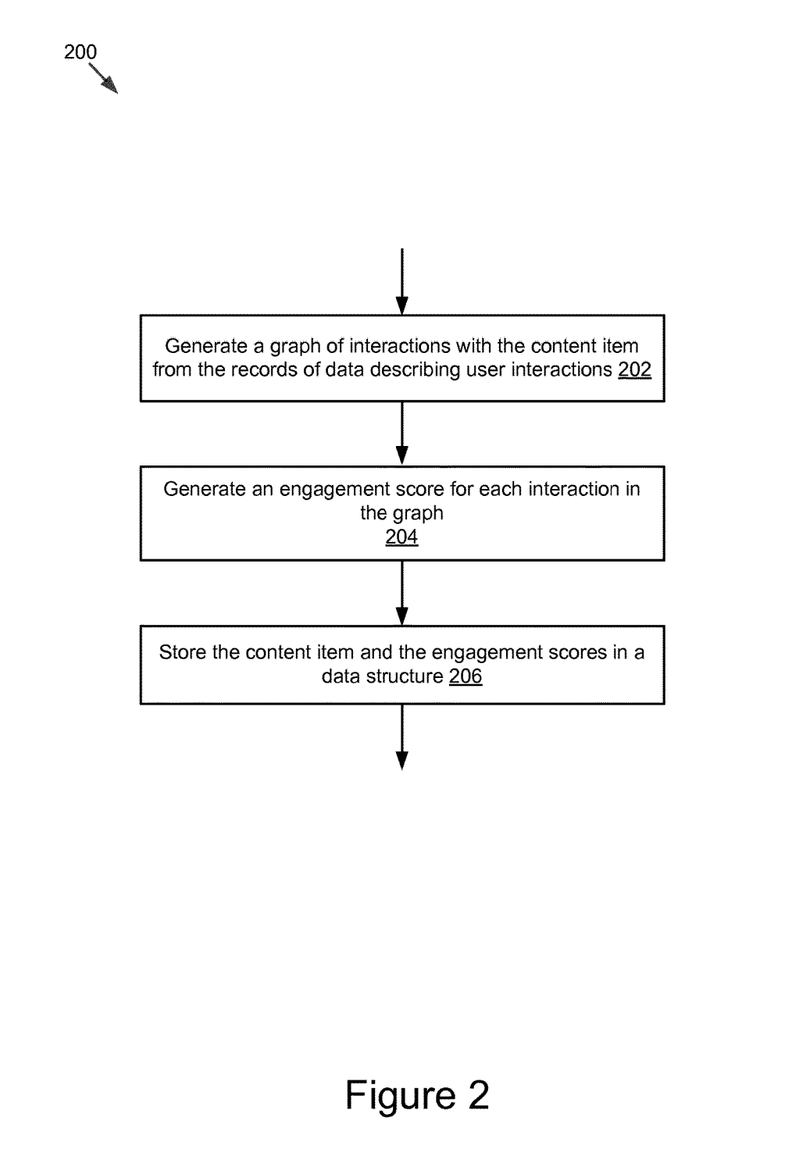
FIG. 2 is a flow chart of an example method for preparing a record of data for generating a model characterizing a network effect of a user interaction with a content item.

FIG. 2 is a flow chart of an example method 200 for preparing a record of data for generating a model characterizing a network effect of a user interaction with a content item. The method 200 begins with the engagement scoring module 922 generating 202 a graph of interactions with the content item from the records of data describing user interactions received by the engagement measurement module 920. The problem of determining the effect of an interaction with a content item can be modeled based on graph semantics. For example, the user interactions can be thought of as a directed acyclic graph whose vertices are user interactions and the edges are the causal relation between the interactions.

Figure 4:
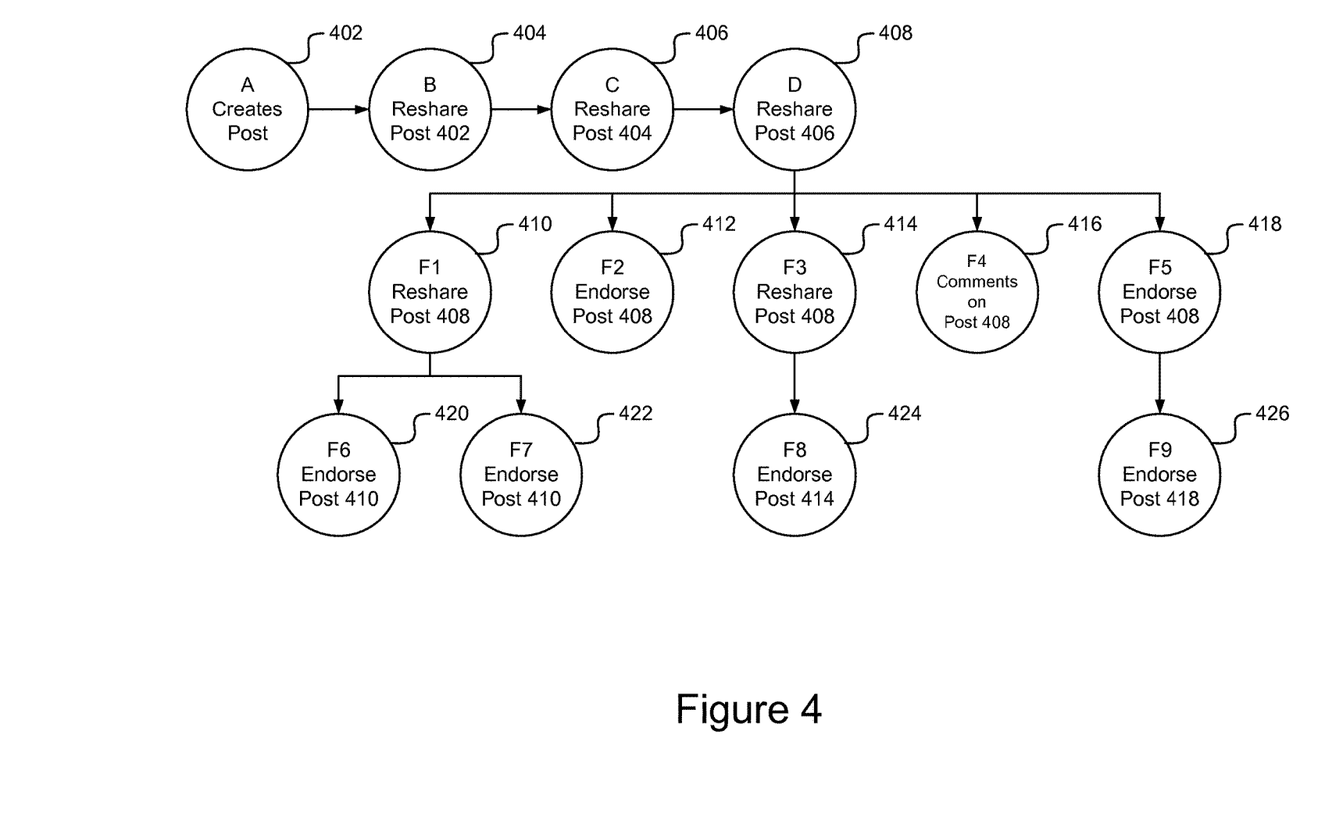
FIG. 4 is a graphic representation of interactions with a content item in a social network.

FIG. 4 is a graphic representation of example interactions with a content item in a social network. The following example is illustrated with reference to FIG. 4. User A creates post 402. Post 402 may be, for example, a status update, a photo, video, or other media item the user shares, or the like. User B may see post 402 in his social network stream and reshare post 402 as post 404. Similarly, User C sees post 404 and reshares post 404 as post 406. User D, who has a large network, reshares post 406 as post 408. Friends, F1 and F3, of User D see and reshare post 408 as posts 410 and post 414, respectively. Friends, F2 and F5, of User D endorse post 408. In some implementations, posts 412 and 418 are generated to show the endorsement of post 408 by F2 and F5, respectively. Friend F4 comments on post 408 and the comment is published as post 416. Friends, F6 and F7, endorse post 410 and posts 420 and 422 are generated to show the endorsement. Friends, F8 and F9, endorse posts 414 and 418, respectively. Posts 424 and 426 may be generated to show the endorsement of posts 414 and 418 by F8 and F9.

Each vertex of the graphic representation depicted in the example of FIG. 4 is a user interaction with the social network. As described elsewhere herein, an interaction may be defined by a tuple <user, subject post, action, resultant post, timestamp>. However, any tuple or organization structure may be used to define a user interaction with the social network. The example tuple indicates that a user (e.g., User C) took an action (e.g., reshared post 404) at some time (indicated by a timestamp) on a subject post (e.g., post 404) that resulted in a resultant post (e.g., post 406). The graphic representation indicates the causal relationship between the user interactions. Interactions may include, for example, creating a post, resharing a post, commenting on a post, endorsing a post, endorsing a comment on a post, clicking on media (e.g., photo, video, etc.) embedded in a post, clicking on a link in a post, or the like. In some implementations, interactions, for example, clicks on media or links, endorsing comments etc., do not produce resultant posts and so the resultant post in the tuple could be null.

Figure 5:
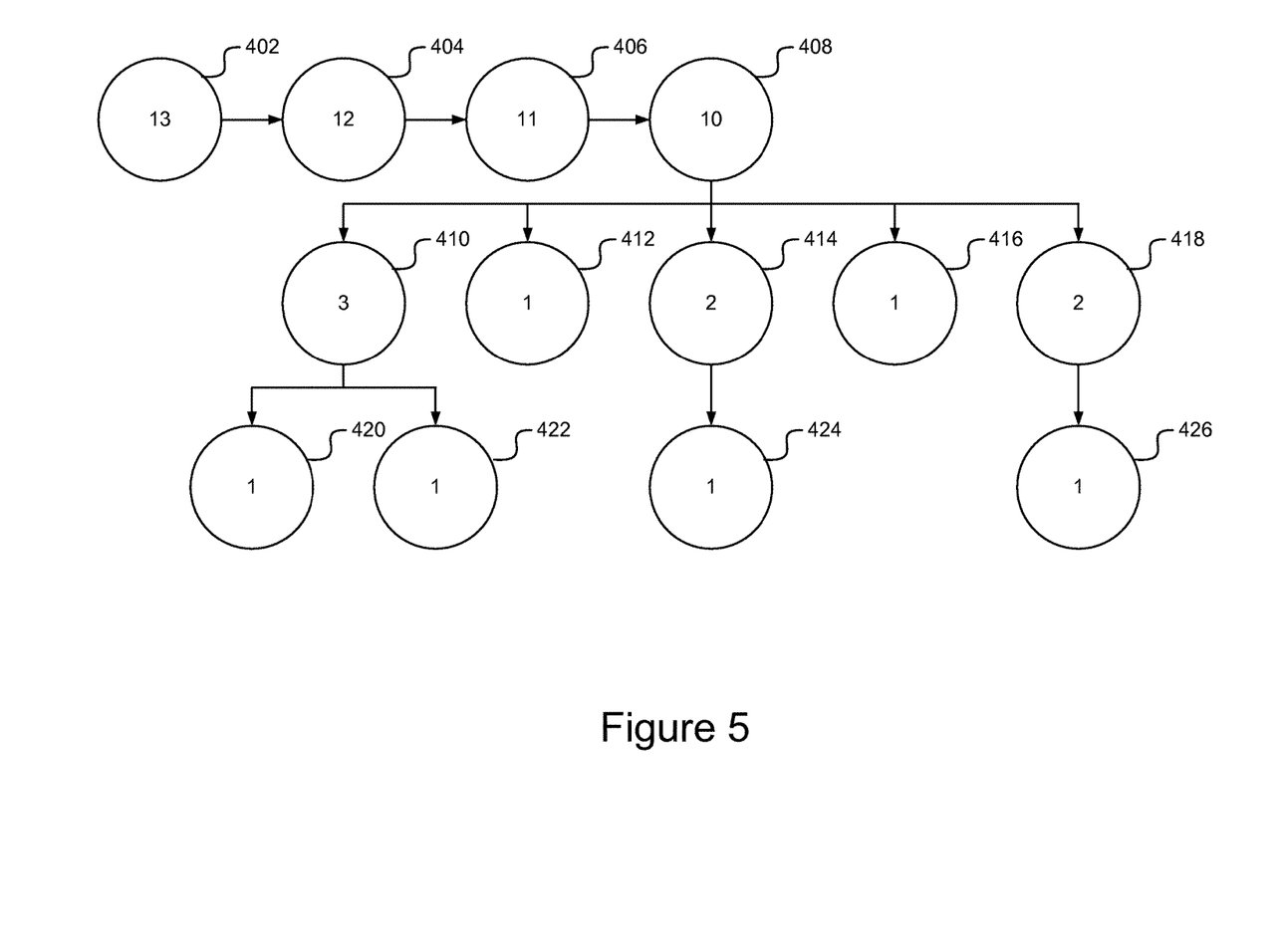
FIGS. 5 and 6 are graphic representations of interactions with a content item in a social network including an engagement score for each interaction.

Returning to FIG. 2, at 204, the engagement scoring module 922 generates an engagement score for each interaction in the graph. In one implementation, as illustrated in the example of FIG. 5, each interaction from the example of FIG. 4 receives an engagement score based on the number of interactions that stem from the interaction being scored. For example, post 402 receives a score of 13 (the initial post and the twelve interactions that stem from the post created by user A). In some implementations, the age of the interaction may be taken into account to provide more accurate comparison between interactions since an older interaction would have had more time to generate interactions in comparison to a newer interaction. For example, the scoring module 922 may only score interactions that stem from a root interaction up to a particular number of days (e.g., 7 days).

As shown in the example of FIG. 4, the User D and his friends have contributed more to the overall engagement of the network than User A and his friends. Therefore, it would be appropriate for the engagement score of post 408 to reflect this effect. To address this phenomenon, a discount factor may be introduced to the scoring methodology to partially attribute each interaction to the root interaction such that an interaction that is further down the interaction tree has a lower influence on engagement score of the root interaction. In one implementation, the engagement score may be calculated using the function:

$$\text{score}(n) = \sum_{i \in \text{subtree}_k(n)} f^{\text{depth}(n,i)}$$

where:
score(n) is the score for interaction n,
$\text{subtree}_k(n)$ is the set of interactions in the subtree rooted at interaction n, up to k days old,
depth(n,i) is the depth of the interaction i in the subtree rooted at interaction n,
f is the discount factor.

Figure 6:
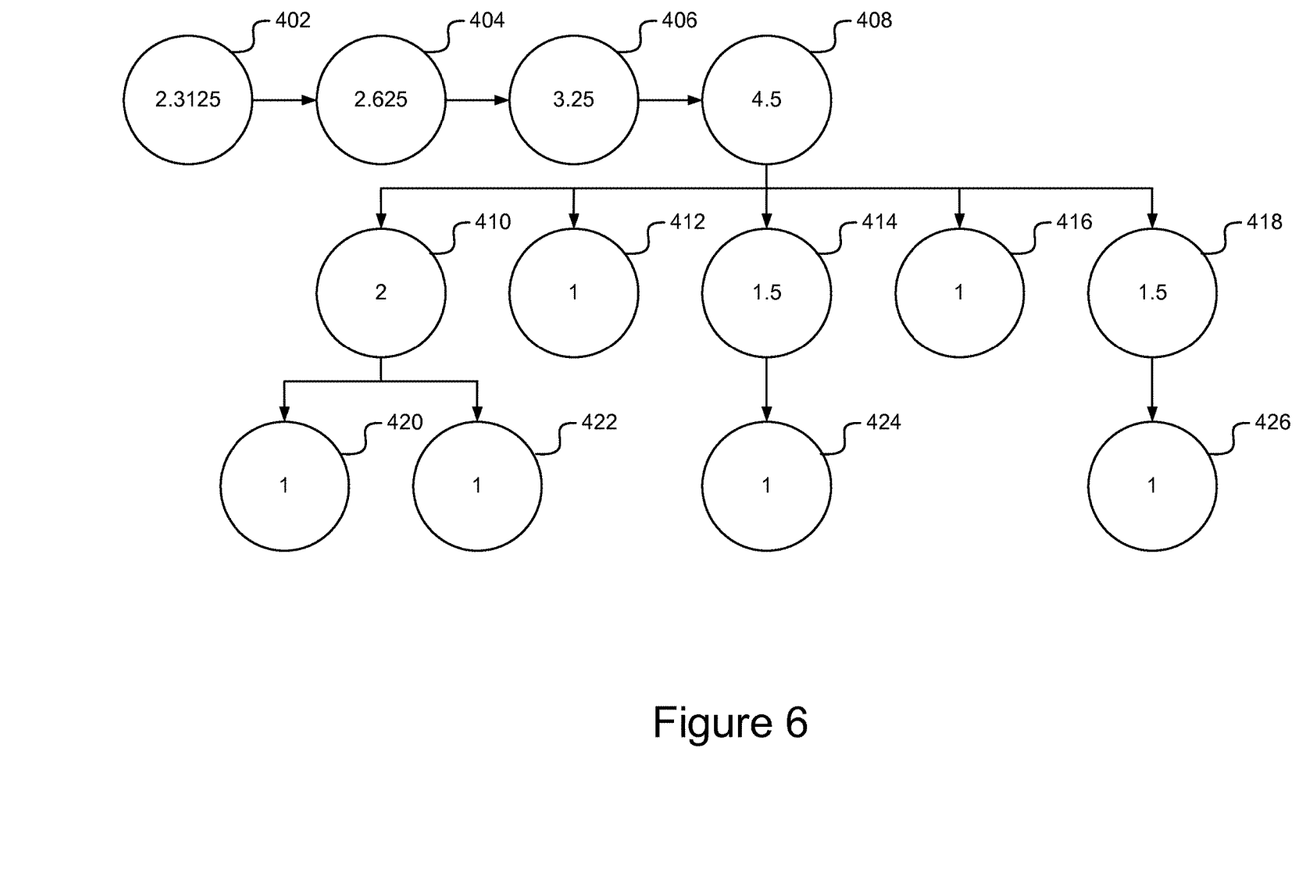

FIG. 6 illustrates an example of scores generated for the interactions of FIG. 4 using a discount factor in the scoring methodology. In the example of FIG. 6, a discount factor of 0.5 is used. However, the discount factor can be set at any value based on how much weight should be attributed to interactions down the interaction tree. In some implementations, multiple scores may be computed over a range of discount factors simultaneously. Returning to the example of FIG. 2, the engagement scoring module 922 stores that content item and the engagement scores in a data structure, for example in database 943.

Figure 3:
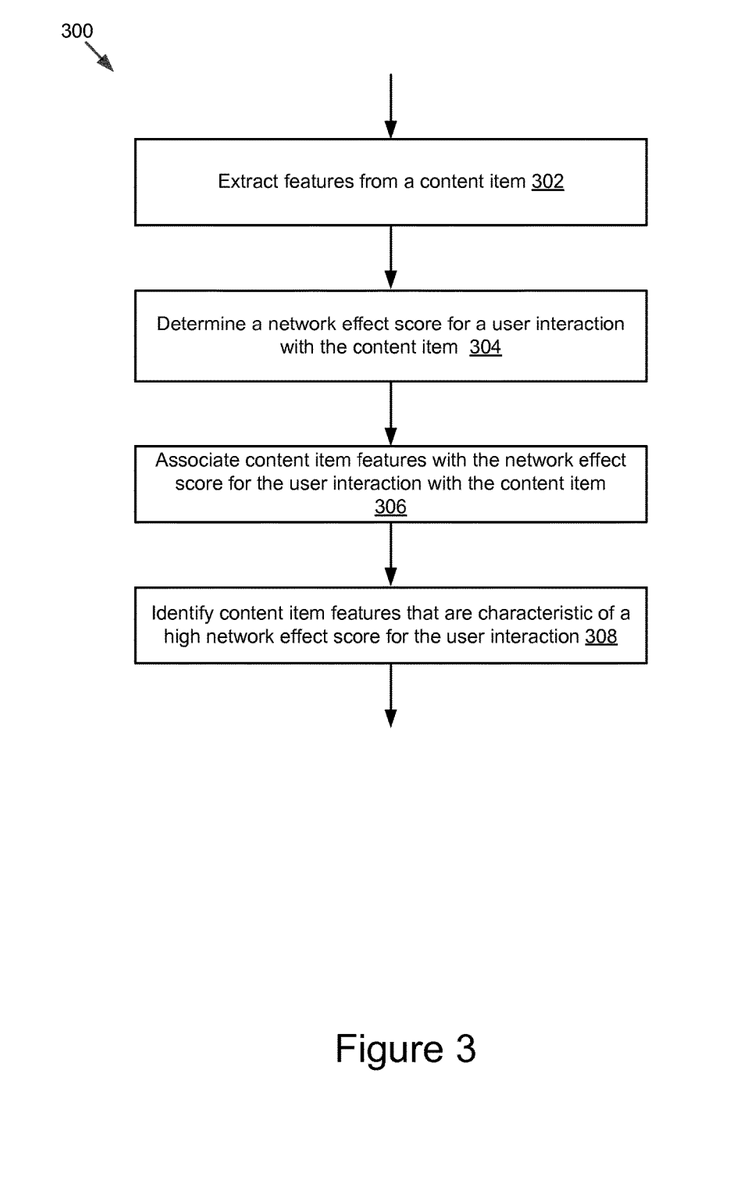
FIG. 3 is a flow chart of an example method for generating a model characterizing a network effect of a user interaction with a content item.

FIG. 3 is a flow chart of an example method 300 for generating a model characterizing a network effect of a user interaction with a content item. At 302, the training module 924 extracts features from a content item. Features may include, for example, text keywords, image features, video features, link destinations, and the like. The method 300 continues at 304 with the training module 924 determining a network effect score for a user interaction with the content item. The network effect score of an interaction may be based on the engagement scores calculated by the engagement scoring module 922. For example, in one implementation, the network effect score may be the sum of the engagement scores stemming from the interaction. In some implementations, a network effect score of an interaction may be the number of subsequent interactions based on the initial interaction.

At 306, the training module 924 associates content item features with the network effect score for the user interaction with the content item. The association may be made, for example, in a database of user interactions and network effect scores. At 308, the training module 924 may identify content item features that are characteristic of a high network effect score for the user interaction. For example, the training module 924 may implement a machine learning algorithm that identifies trends between content features and network effect scores.

Figure 7:
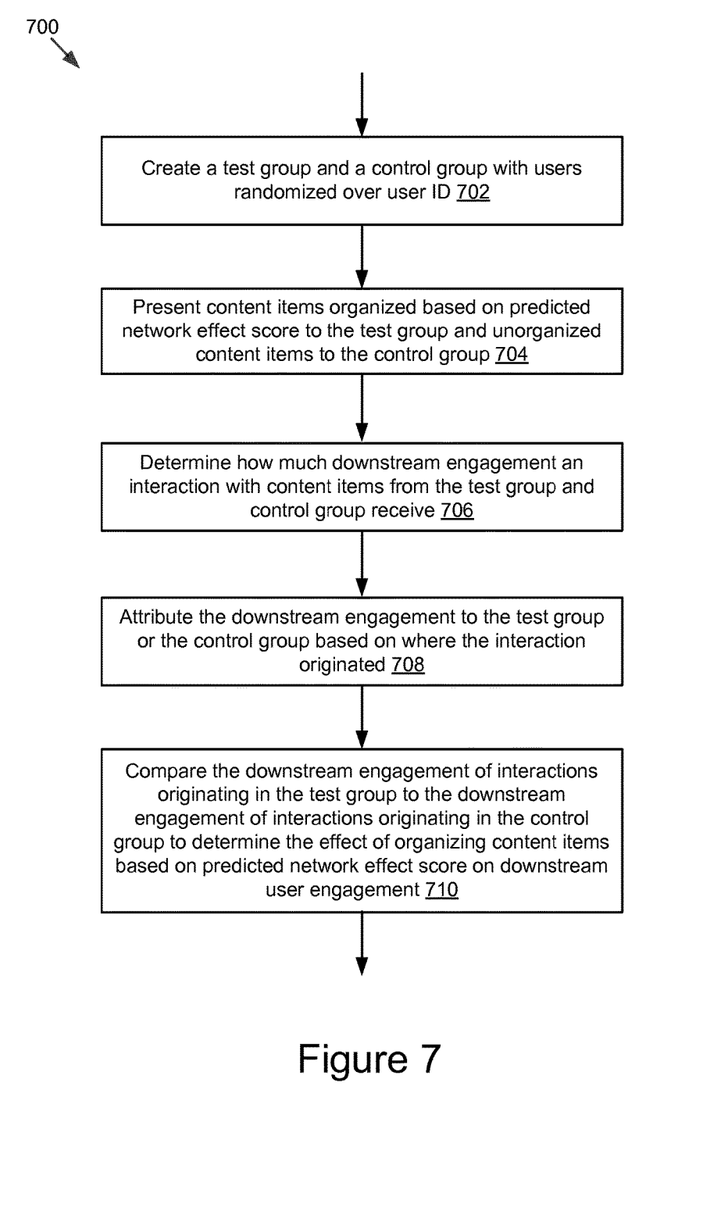
FIG. 7 is a flow chart of an example method for testing the network effect of a stream of content items generated using the techniques described herein.

FIG. 7 is a flow chart of an example method 700 for testing the network effect of a stream of content items generated using the techniques described herein. A network effect testing module 928 may run experiments to determine effectiveness of the organized content items in increasing overall network engagement. One method for measuring the effectiveness of the organized content items may be to isolate a number of users into a control group and a test group, measure the network engagement of the two groups, and compare the results. However, particularly in dense social networks, it is nearly impossible to completely isolate two test groups of significant size. Instead, the network effect testing module 928 creates 702 a test group and a control group with users randomized over user ID.

At 704, the network effect testing module 928 presents content items organized based on predicted network effect score to the test group and unorganized content items to the control group. The network effect testing module 928 determines 706 how much downstream engagement an interaction with content items from the test group and the control group receive. For example, the network effect testing module 928 may generate a network effect score, as discussed above with reference to FIG. 3, for each interaction with a content item.

To isolate the test group from the control group, the network effect testing module 928 attributes the downstream engagement to either the test group or the control group based on where the interaction originated. For example, if a user from the control group interacts with a content item in response to an interaction from a user from the test group (e.g., the user from the control group comments on a content item reshared by the user from the test group), the interaction is attributed to the test group.

The network effect testing module 928 compares 710 the downstream engagement attributed to interactions originating in the test group to the downstream engagement of interactions originating in the control group to determine the effect of organizing content items based on predicted network effect score on downstream user engagement.

Figure 8:
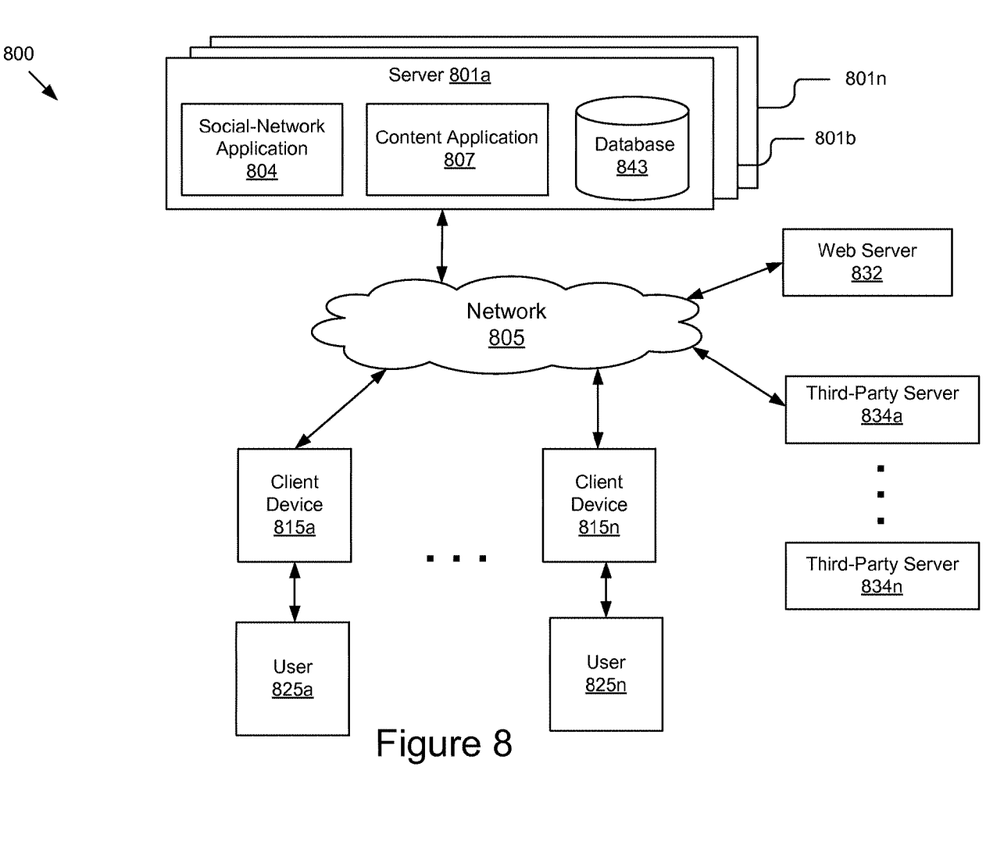
FIG. 8 is a high-level block diagram illustrating an example system for ranking and selecting content items for presentation to users in a social network.

FIG. 8 is a high-level block diagram illustrating an example system 800 for ranking and selecting content items for presentation to users in a social network. The illustrated system 800 includes client devices 815a-815n (also referred to herein individually and collectively as 815) that are accessed by users 825a-825n (also referred to herein individually and collectively as 825), social network servers 801a-801n (also referred to herein individually and collectively as 801) having a social network application 804, a content application 807, and a database 843. The system 800 also includes a number of products or services offered by a web server 832 and third party servers 834a-834n. In some implementations, the third party servers 834 may include a location server, a micro blogging server, an email server, a Short Message Service (SMS)/Multimedia Messaging Service (MMS) server, an Instant Messaging (IM) server, a search server, an advertisement server, a document server, a blogging server, a news feed server, a video sharing server, a photo sharing server, a map server, and any other third party server.

The client devices 815a-815n in FIG. 8 are used by way of example. While FIG. 8 illustrates two client devices 815a and 815n, the present disclosure applies to any system architecture having one or more client devices 815. Furthermore, while only one network 805 is coupled to the client devices 815a-815n, the social network server 801, and the third party servers 834, in practice one or more networks 805 can be connected to these entities.

The social network server 801 is coupled to the network 805 for communication and cooperation with the other components of the system 800. In some implementations, the social network server 801 includes the social network software/application 804. A social network may be any type of social structure where the users 825 are connected by a common feature. The common feature may include relationships/connections, e.g., friendship, family, work, an interest, etc. The common features are provided by one or more social networking systems, for example, those included in the system 800, including explicitly-defined relationships and relationships implied by social connections with other online users, where the relationships form a social graph. In some examples, the social graph can reflect a mapping of these users and how they are related. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, share with other users or a specific user, etc. Furthermore, it should be understood that the social network server 801 and the social network software/application 804 are representative of one social network and that there may be multiple social networks coupled to the network 805, each having its own server, application and social graph. For example, a first social network may be more directed to business networking, a second may be more directed to or centered on academics, a third may be more directed to local business, a fourth may be directed to dating and others of general interest or a specific focus.

In some implementations, the social network server 801 receives and sends data and social information provided by the other servers 832 and 834. For example, the social network server 801 receives and sends social information or events performed on web pages and/or applications hosted by the servers 832 and 834. The web pages and/or applications may include a user interface allowing a user 825 to respond to, comment on, or endorse a product, a video, a search result, a widget, a post, a comment, a photo, an article, etc., shown on the web pages and/or applications.

The client devices 815 can be any computing device including one or more memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. In some implementations, the system 800 includes a combination of different types of client devices 815. For example, a combination of a personal computer and a mobile phone. It should be understood that the present technologies can operate on different models other than a client-server architecture.

The client device 815 may include a web browser configured for two-way communications with the servers 801, 832, and 834. For example, the browser may be stored on the client device as a software application for retrieving, presenting and traversing information resources on the web.

The network 805 enables communications between the client devices 815a-n, the social network server 801, the web server 832, and the third party servers 834. Thus, the network 805 can include links using technologies including, for example, Wi-Fi, Wi-Max, 2G, Universal Mobile Telecommunications System (UMTS), 3G, Ethernet, 502.11, integrated services digital network (ISDN), digital subscriber line (DSL), asynchronous transfer mode (ATM), InfiniBand, PCI Express Advanced Switching, etc. Similarly, the networking protocols used on the network 805 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 805 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 805 can also include links to other networks.

In some implementations, the network 805 is a partially public or a wholly public network, for example, the Internet. The network 805 can also be a private network or include one or more distinct or logical private networks (e.g., virtual private networks, Wide Area Networks ("WAN") and/or Local Area Networks ("LAN")). Additionally, the communication links to and from the network 805 can be wired or wireless (i.e., terrestrial or satellite-based transceivers). In some implementations, the network 805 is an IP-based wide or metropolitan area network.

The network 805 may have any number of configurations including a star configuration, token ring configuration or other configurations. Furthermore, the network 805 may include a local area network (LAN), a wide area network (WAN) (e.g., the Internet), and/or any other interconnected data path across which multiple devices may communicate. In some implementations, the network 805 may be a peer-to-peer network. The network 805 may also be coupled to or include portions of a telecommunications network for sending data in a variety of different communication protocols. In some implementations, the network 805 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

Figure 9:
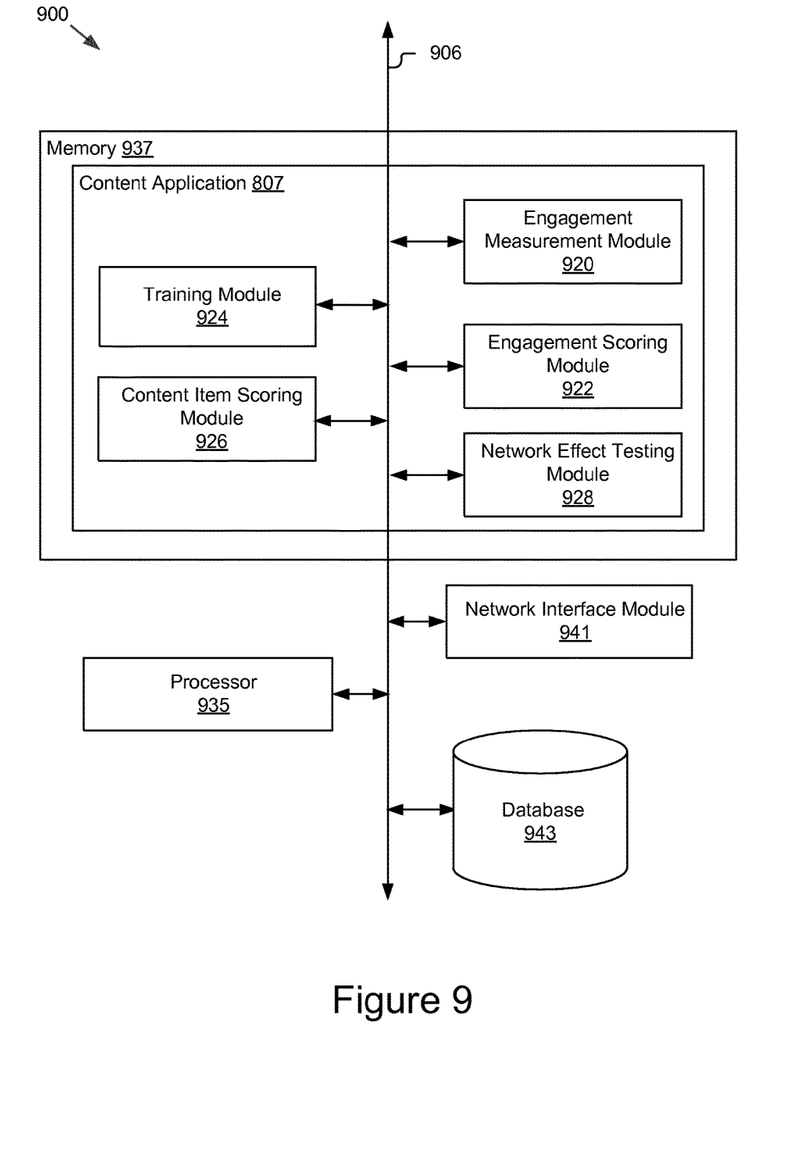
FIG. 9 is a block diagram illustrating an example social network server including a content application for ranking and selecting content items for presentation to users in a social network.

FIG. 9 is a block diagram illustrating an example social network server 900 including a content application for ranking and selecting content items for presentation to users in a social network. In the illustrated implementations, the social network server 900 includes a network interface (I/F) module 941, a processor 935, a memory 937, and a database 943. These components of the social network server 900 are communicatively coupled to a bus or software communication mechanism 906 for communication with each other.

The network interface module 941 is configured to connect social network server 900 to the network 805. For example, network interface module 941 may enable communication through one or more of the internet, cable networks, and wired networks. The network interface module 941 links the processor 935 to the network 805 that may in turn be coupled to other processing systems. The network interface module 941 also provides other conventional connections to the network 80 for distribution of files and/or media objects using standard network protocols, e.g., TCP/IP, HTTP, HTTPS and SMTP as will be understood. In some implementations, the network interface module 1102 includes a transceiver for sending and receiving signals using WiFi, Bluetooth® or cellular communications for wireless communication.

The processor 935 may include an arithmetic logic unit, a microprocessor, a general purpose controller or some other processor array to perform computations and provide electronic display signals to a display device. In some implementations, the processor 935 is a hardware processor. The processor 935 is coupled to the bus 906 for communication with the other components. Processor 935 processes data signals and may include various computing architectures including a complex instruction set computer (CISC) architecture, a reduced instruction set computer (RISC) architecture, or an architecture implementing a combination of instruction sets. Although only a single processor is shown in FIG. 9, multiple processors may be included. It should be understood that other processor configurations are possible.

The memory 937 stores instructions and/or data that may be executed by the processor 935. In the illustrated implementation, the memory 937 stores the content application 807. Although not shown in the example of FIG. 9, the memory 937 may also store the social network application 804. The memory 937 is coupled to the bus 906 for communication with the other components of the social network server 900. The instructions and/or data may include code for performing any and/or all of the techniques described herein. The memory 937 may be non-transitory memory for example as a dynamic random access memory (DRAM) device, a static random access memory (SRAM) device, flash memory or some other memory devices.

The database 943 may be stored on a non-transitory storage device. For example, the storage device may be a dynamic random access memory (DRAM) device, a static random access memory (SRAM) device, flash memory or some other memory device. In some implementations, the storage device also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

Software communication mechanism 906 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 906 can be implemented on any underlying hardware, for example, a network, the Internet, a bus, a combination thereof, etc.

The content application 807, stored on memory 937 and configured to be executed by processor 935, includes an engagement measurement module 920, an engagement scoring module 922, a training module 924, a content item scoring module 926, and a network effect testing module 928. The engagement measurement module 920 can be software or routines for logging user interactions with content items in the social network. In some implementations, the user interactions can include creating a new content item; endorsing an existing content item, resharing an existing content item, commenting on an existing content item, endorsing an comment on an existing content item, clicking-through a link in an existing content item, playing media associated with an existing content item, or the like. The engagement measurement module 920 may store a tuple <user, subject content item, interaction type, resultant content item, timestamp> in a data structure in database 943 as described elsewhere herein.

The engagement scoring module 922 can be software or routines for generating an engagement score based on user interactions with a content item in the social network. As described above with reference to FIG. 2, the engagement scoring module 922 scores each interaction with a content item and stores the scores along with the content item for analysis by the training module 924. In some implementations, a user interaction may be classified as a primary/non-silent or secondary/silent interaction. A primary interaction may be one which results in a post or other indication of the interaction being made in the social network. Some examples of a primary interaction may be a reshare, an endorsement, a comment on a post, or the like. A secondary interaction may be one which does not result in any visible indication of the interaction to other users in the social network. For example, the secondary interaction may be following a link in a post, interacting with media (e.g., a video play or photo expand), or the like. The engagement scoring module 922, in one implementation, gives equal weight to both primary and secondary interactions. In other implementations, the engagement scoring module 922 may give a higher weight to one type of interaction over another based on a preference for primary, secondary, or a particular interaction type. Weighting interactions by the engagement scoring module 922 may be beneficial in driving users of the social network to engage in a particular type of interaction. For example, giving higher weight to following a link in a content item may result in more links being displayed and higher traffic to partner websites. In this way, the engagement scoring module 922 may influence interactions based on a result desired by the administrators of the social network.

The training module 924 can be software or routines for generating a model characterizing a network effect of a user interaction with a content item in the social network. As described above, the training module may use machine learning techniques, e.g., a linear or weighted logistic regression, to predict the value of a user interaction with a content item in a social network. The network effect of a user interaction with the content item in the social network may be defined as how many subsequent interactions the user interaction generates. In some implementations, each subsequent interaction is given equal weight and a total number of interactions may be the network effect score. In other implementations, interactions (e.g., primary or secondary interactions) may be given varied weights and the network effect score of the user interaction may be calculated as a function of the number of interactions and their respective weights.

The content item scoring module 926 can be software or routines for generating a predicted network effect score for a plurality of content items based on the model generated by the training module 924. For example, when a user logs on to the social network, the content item scoring module 926 may retrieve content items from an index of content items available to present to the user and generate the predicted network effect score for each of the available content items. In some implementations, the content item scoring module 926 organizes content items accessible to the user based on the predicted network effect score. In other implementations, the content item scoring module 926 may balance a user engagement score and the predicted network effect score to determine the content items that will result in the greatest overall network engagement and user engagement. In further implementations, the content item scoring module 926 may take into account the user's network when determining the predicted network effect score. For example, a user with a large network who frequently interacts with the social network may be identified as an influencer and additional weight may be given to a particular content item or interaction type to increase engagement with that content item or through that interaction type. The organized content items may then be presented to the user in a content stream on the social network.

The network effect testing module 928 can be software or routines for testing the network effect of a stream of content items generated as described with reference to FIG. 7 above. As described above, traditional A/B testing methods may not be effective in capturing a network effect of a user interaction in a social network due to the network effect bleeding from a test group to a control group. This is particularly true in a large, dense social network where it may be impossible to isolate users into test and control groups that do not have any common connections. To solve this problem, the network effect testing module attributes downstream engagements to the test group or control group based on which group the interacting user belongs to. This allows measurements that quantify the effect of organizing content items based on a predicted network effect to be made. The administrators of the social network may then be able to determine the actual network effect score of an interaction and quantify the impact of organizing content items based on predicted network effect scores.

Systems and methods for ranking and selecting content items for presentation to users in a social network that increase the overall engagement of the social network have been described. While the present disclosure is described in the context of a social network, it should be understood that the terms "products" and "services" are used interchangeably throughout this specification and are used herein to encompass their plain and ordinary meaning including, but not limited to any online service, online product, online software that provides services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. A computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
receiving, using one or more processors, a record of data describing user engagement with a plurality of content items in an online service;
identifying, from the record of data, a first user interaction with a content item and a sequence of interactions resulted from the first user interaction in the online service;
generating a graph of interactions with the content item in the online service, wherein a vertex of the graph represents a user interaction of identified interactions and an edge represents a causal relation between the identified interactions;
calculating an engagement score for an interaction in the graph by setting the interaction as a root interaction, identifying a subtree interaction of a first depth from the root interaction and calculating a first discounted factor based on the first depth, identifying a subtree interaction of a second depth from the root interaction and calculating a second discounted factor based on the second depth, and wherein the engagement score is a sum of the first discounted factor multiplied by a first number of subtree interactions of the first depth and the second discounted factor multiplied by a second number of subtree interactions of the second depth;
weighting the interaction in the graph based on a type of interaction to drive users of the online service to engage with a particular type of interaction and for presentation of content items related to the particular type of interaction;
determining a network effect score for the first user interaction based on the engagement score and the weighting of the interaction in the graph;
generating and training, using the one or more processors, a model characterizing a network effect of the first user interaction with the content item in the online service based on the graph of interactions, different discount factors, and the network effect score;
generating, using the one or more processors, a predicted network effect score for the content item of the plurality of content items based on the model, the engagement score, and the weighting to predict the network effect made by presentation of the content item;

organizing, using the one or more processors, the plurality of content items based on the predicted network effect score; and transmitting, using the one or more processors, the plurality of organized content items for presentation to a user.

2. The method of claim 1, further comprising storing the content item and the engagement score in a data structure.

3. The method of claim 1, further comprising:

associating, using the one or more processors, content item features with the network effect score for the first user interaction with the content item;

identifying, using the one or more processors, the content item features that are characteristic of a high network effect score for the first user interaction; and wherein generating the model is based on identified content item features.

4. The method of claim 3, wherein identifying the content item features that are characteristic of the high network effect score includes performing a regression analysis on the plurality of content items and associated network effect scores.

5. The method of claim 1, wherein determining the network effect score for the first user interaction comprises:

determining, using the one or more processors, an interaction type to increase; and increasing, using the one or more processors, a weight given to a selected user interaction in determining the network effect score.

6. The method of claim 1, wherein the first user interaction is one from the group of: creating a new content item, endorsing an existing content item, resharing an existing content item, commenting on an existing content item, endorsing a comment on an existing content item, clicking-through a link in an existing content item, or playing media associated with an existing content item.

7. The method of claim 1, comprising transmitting a recommended interaction for the content item to the user, wherein the recommended interaction is based on the predicted network effect score.

8. A computer program product comprising a non-transitory computer usable medium including a computer readable program, wherein the computer readable program when executed on a computer causes the computer to:

receive a record of data describing user engagement with a plurality of content items in an online service;

identify, from the record of data, a first user interaction with a content item and a sequence of interactions resulted from the first user interaction in the online service;

generate a graph of interactions with the content item in the online service, wherein a vertex of the graph represents a user interaction of identified interactions and an edge represents a causal relation between the identified interactions;

calculate an engagement score for an interaction in the graph by setting the interaction as a root interaction, identifying a subtree interaction of a first depth from the root interaction and calculating a first discounted factor based on the first depth, identifying a subtree interaction of a second depth from the root interaction and calculating a second discounted factor based on the second depth, and wherein the engagement score is a sum of the first discounted factor multiplied by a first number of subtree interactions of the first depth and the second discounted factor multiplied by a second number of subtree interactions of the second depth;

weight the interaction in the graph based on a type of interaction to drive users of the online service to engage with a particular type of interaction and for presentation of content items related to the particular type of interaction;

determine a network effect score for the first user interaction based on the engagement score and the weighting of the interaction in the graph;

generate and train a model characterizing a network effect of the first user interaction with the content item in the online service based on the graph of interactions, different discount factors, and the network effect score;

generate a predicted network effect score for the content item of the plurality of content items based on the model, the engagement score, and the weighting to predict the network effect made by presentation of the content item;

organize the plurality of content items based on the predicted network effect score; and transmit the plurality of organized content items for presentation to a user.

9. The computer program product of claim 8, wherein the computer readable program when executed on the computer causes the computer to store the content item and the engagement score in a data structure.

10. The computer program product of claim 8, wherein the computer readable program when executed on the computer causes the computer to:

associate content item features with the network effect score for the first user interaction with the content item;

identify the content item features that are characteristic of a high network effect score for the first user interaction; and wherein generating the model is based on identified content item features.

11. The computer program product of claim 10, wherein to identify the content item features that are characteristic of the high network effect score, the computer readable program when executed on the computer causes the computer to perform a regression analysis on the plurality of content items and associated network effect scores.

12. The computer program product of claim 8, wherein to determine the network effect score for the first user interaction, the computer readable program when executed on the computer causes the computer to:

determine an interaction type to increase; and increase a weight given to a selected user interaction in determining the network effect score.

13. The computer program product of claim 8, wherein the first user interaction is one from the group of: creating a new content item, endorsing an existing content item, resharing an existing content item, commenting on an existing content item, endorsing a comment on an existing content item, clicking-through a link in an existing content item, or playing media associated with an existing content item.

14. The computer program product of claim 8, wherein the computer readable program when executed on the computer causes the computer to transmit a recommended interaction for the content item to the user, wherein the recommended interaction is based on the predicted network effect score.

15. A system comprising:
a processor; and
a memory storing instructions that, when executed, cause the system to:
  receive a record of data describing user engagement with a plurality of content items in an online service;
  identify, from the record of data, a first user interaction with a content item and a sequence of interactions resulted from the first user interaction in the online service;
  generate a graph of interactions with the content item in the online service, wherein a vertex of the graph represents a user interaction of identified interactions and an edge represents a causal relation between the identified interactions;
  calculate an engagement score for an interaction in the graph by setting the interaction as a root interaction, identifying a subtree interaction of a first depth from the root interaction and calculating a first discounted factor based on the first depth, identifying a subtree interaction of a second depth from the root interaction and calculating a second discounted factor based on the second depth, and wherein the engagement score is a sum of the first discounted factor multiplied by a first number of subtree interactions of the first depth and the second discounted factor multiplied by a second number of subtree interactions of the second depth;
  weight the interaction in the graph based on a type of interaction to drive users of the online service to engage with a particular type of interaction and for presentation of content items related to the particular type of interaction;
  determine a network effect score for the first user interaction based on the engagement score and the weighting of the interaction in the graph;
  generate and train a model characterizing a network effect of a first user interaction with a network effect the first user interaction with the content item in the online service based on the graph of interactions, different discount factors, and the network effect score;
  generate a predicted network effect score for the content item of the plurality of content items based on the model, the engagement score, and the weighting to predict the network effect made by presentation of the content item;
  organize the plurality of content items based on the predicted network effect score; and
  transmit the plurality of organized content items for presentation to a user.

16. The system of claim 15, wherein the instructions, when executed, cause the system to store the content item and the engagement score in a data structure.

17. The system of claim 15, wherein the instructions, when executed, cause the system to:
  associate content item features with the network effect score for the first user interaction with the content item;
  identify the content item features that are characteristic of a high network effect score for the first user interaction; and
  wherein generating the model is based on identified content item features.

18. The system of claim 17, wherein to identify the content item features that are characteristic of the high network effect score, the instructions, when executed, cause the system to perform a regression analysis on the plurality of content items and associated network effect scores.

19. The system of claim 15, wherein to determine the network effect score for the first user interaction, the instructions, when executed, cause the system to:
  determine an interaction type to increase; and
  increase a weight given to a selected user interaction in determining the network effect score.

20. The system of claim 15, wherein the first user interaction is one from the group of: creating a new content item, endorsing an existing content item, resharing an existing content item, commenting on an existing content item, endorsing a comment on an existing content item, clicking-through a link in an existing content item, or playing media associated with an existing content item.

21. The system of claim 15, wherein the instructions, when executed, cause the system to transmit a recommended interaction for the content item to the user, wherein the recommended interaction is based on the predicted network effect score.

* * * * *